United States Patent [19]
Morioka et al.

[11] 3,858,733
[45] Jan. 7, 1975

[54] DEVICE FOR LOADING BULK MATERIALS

[75] Inventors: Akira Morioka, Sagamihara; Hiroshi Iwasaki, Soka, both of Japan

[73] Assignee: Ishikawajima-Harima Jukogyo Kabushiki Kaisha, Tokyo-to, Japan

[22] Filed: June 20, 1972

[21] Appl. No.: 264,427

[30] Foreign Application Priority Data
  Dec. 24, 1971  Japan.................................. 46-1731

[52] U.S. Cl............................... 214/17 CA, 193/30
[51] Int. Cl............................................ B65g 65/32
[58] Field of Search......... 214/17 C, 17 CA; 193/30

[56] References Cited
UNITED STATES PATENTS

| | | | |
|---|---|---|---|
| 1,021,757 | 4/1912 | Blaisdell........................ | 214/17 C X |
| 2,713,408 | 7/1955 | Tench............................... | 193/30 X |
| 2,737,997 | 3/1956 | Himmelheber et al..... | 214/17 CA X |
| 3,241,581 | 3/1966 | Richardson et al. ........ | 214/17 CA X |
| 3,376,202 | 4/1968 | Mescher...................... | 214/17 CA X |
| 3,594,847 | 7/1971 | Rollins........................... | 214/17 C X |
| 3,707,998 | 1/1973 | Dalrymple..................... | 214/17 B X |

*Primary Examiner*—Robert G. Sheridan
*Attorney, Agent, or Firm*—Ernest F. Marmorek

[57] ABSTRACT

A method for loading bulk materials is provided in which a telescopic chute and the pile of bulk materials are maintained within a predetermined range and the bulk materials are discharged while maintaining the volume in the telescopic chute in excess of a predetermined volume and the discharge of bulk materials is stopped when the volume of bulk materials in the telescopic chute is decreased less than a predetermined volume. In discharge operation, the dust rises only in the telescopic chute and may be collected. A telescopic chute is also provided which is best adapted to carry out the method of the present invention.

8 Claims, 27 Drawing Figures

DEVICE FOR LOADING BULK MATERIALS

The present invention relates to generally a method and device for loading bulk materials and more particularly a method for discharging the bulk materials from a telescopic chute without causing the dust to rise and a telescopic chute for carrying out said method.

Much dust rises when the bulk materials such as grains, finely divided aluminum powder or the like are loaded. From the standpoint of the air pollution, the dust clouds produced when the bulk materials are loaded present the serious problems. However, in the conventional bulk loading systems, there is not installed a dust collector or the like so that especially when the grains are loaded into the barges or the like, the workers are heavily covered with dust. Furthermore, the agglomerated dust suspension on the harbor bottoms also presents the serious environmental pollution problem.

The present invention was therefore made to overcome the dust problem which is brought about when the bulk materials are loaded into the barges or the like. Briefly stated, according to the present invention the distance between the discharge end of the telescopic chute and the pile of the bulk materials is maintained in a predetermined range when the bulk materials are discharged from the telescopic chute so that the dust may be prevented from rising.

Figure 7:
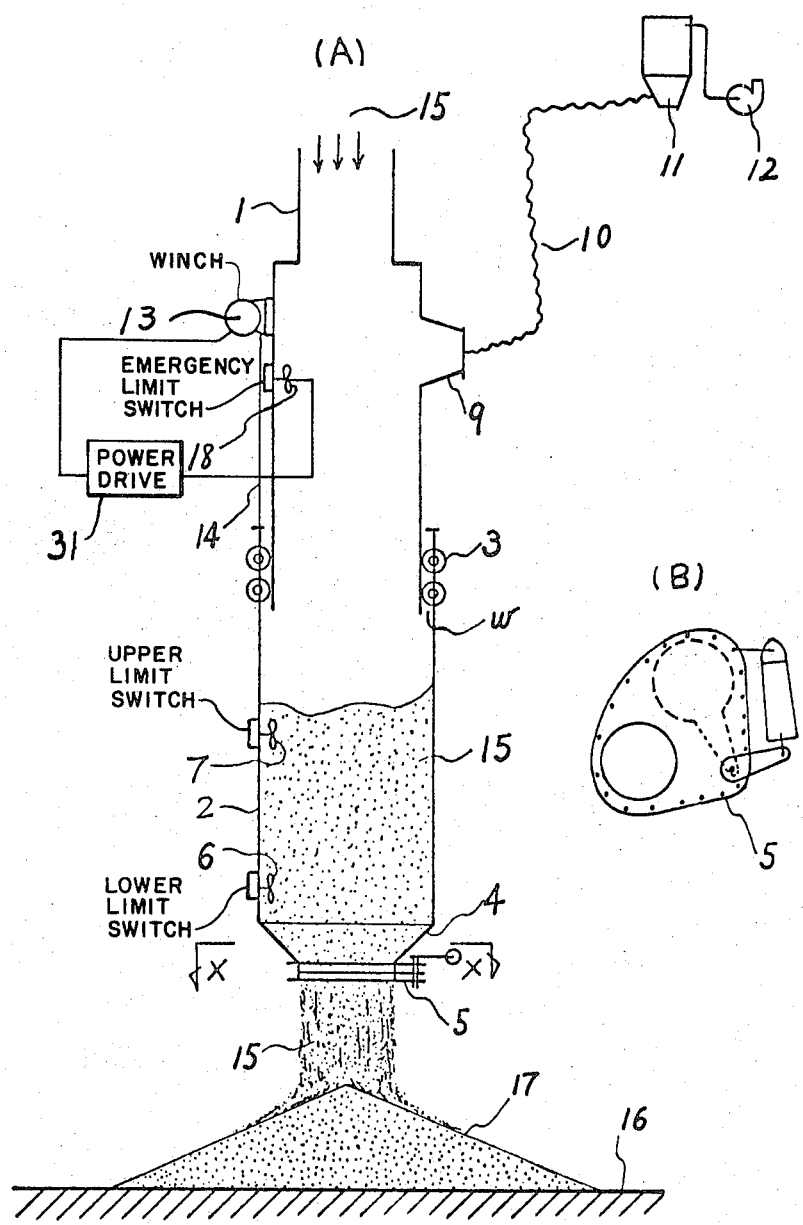
Figure 8:
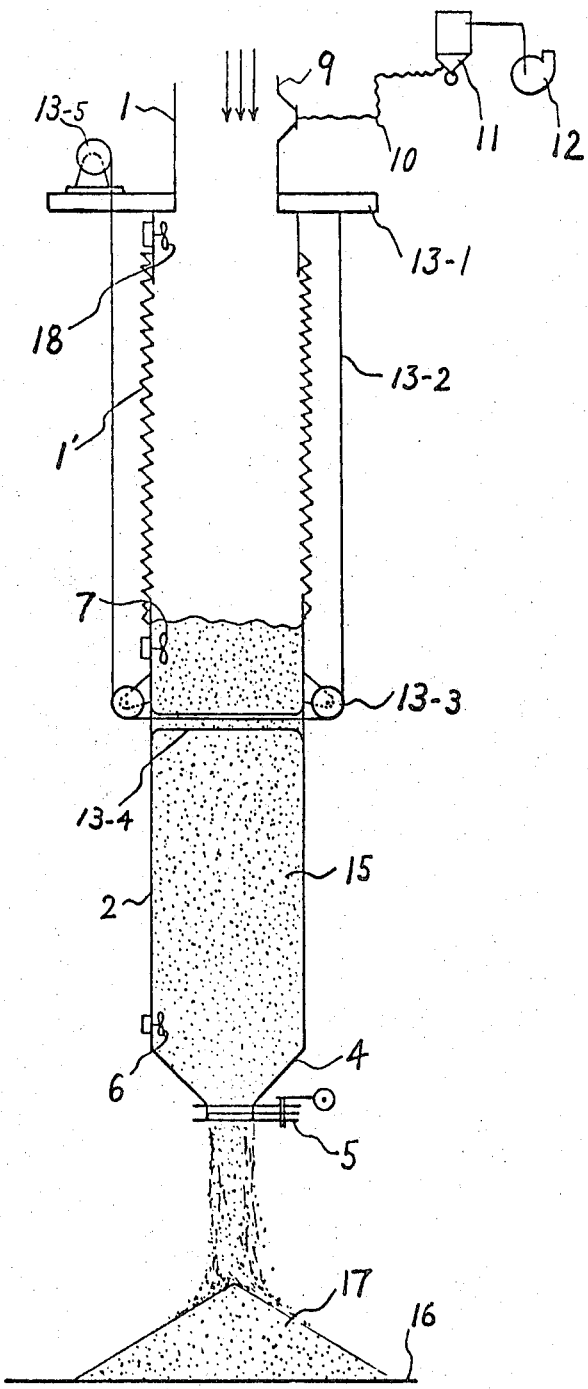
Figure 9:
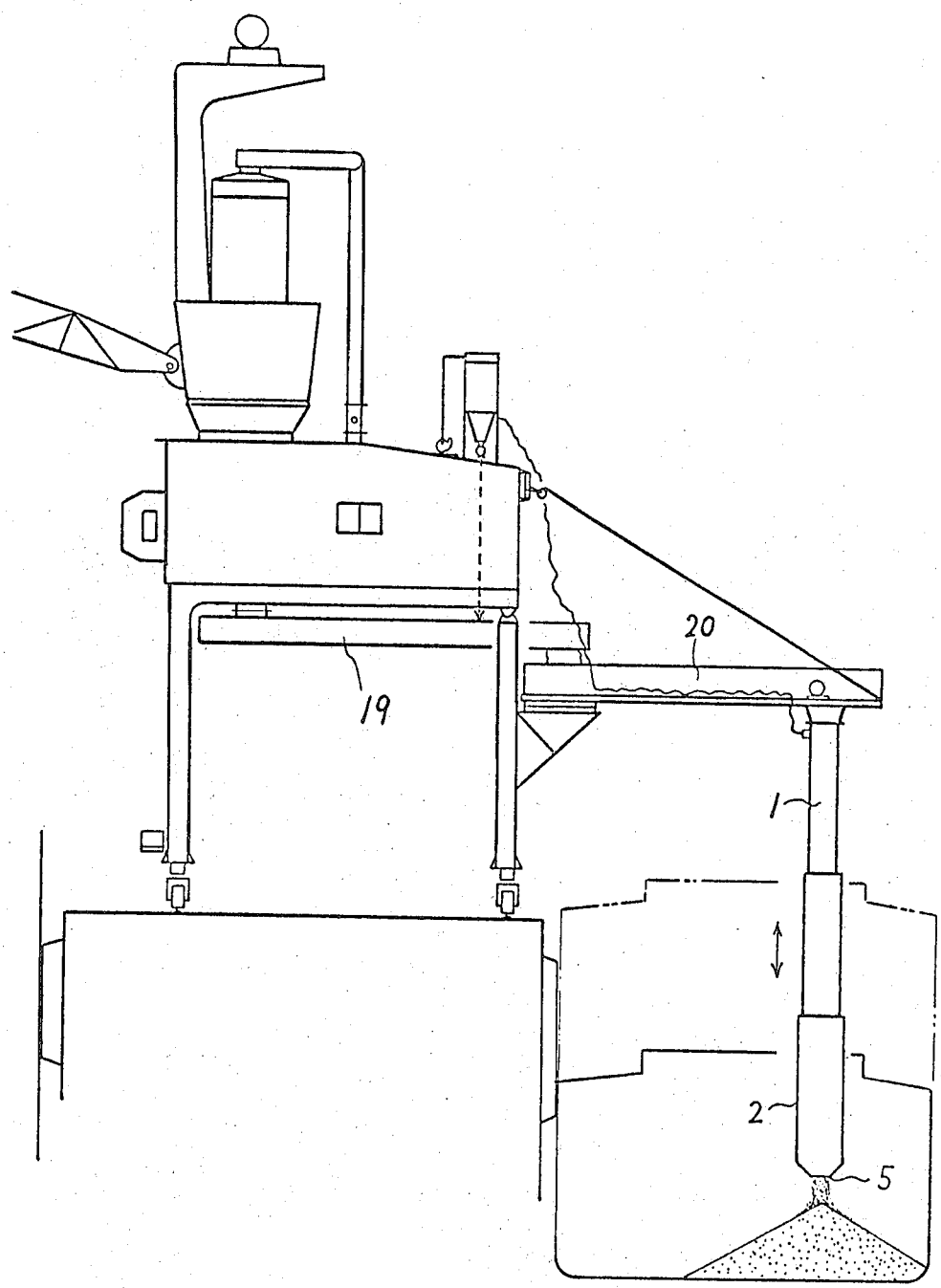
Figure 11:
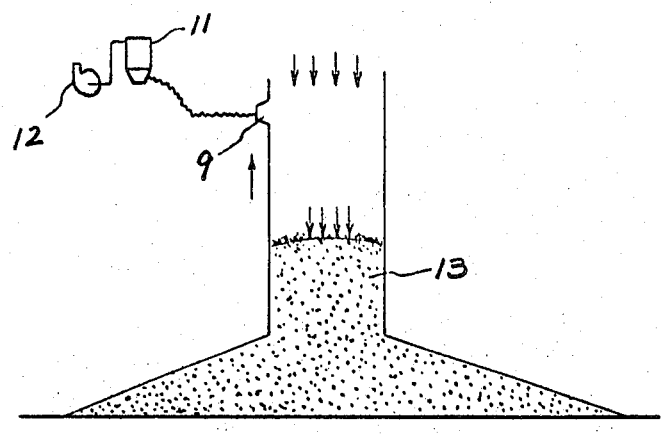
Figure 13:
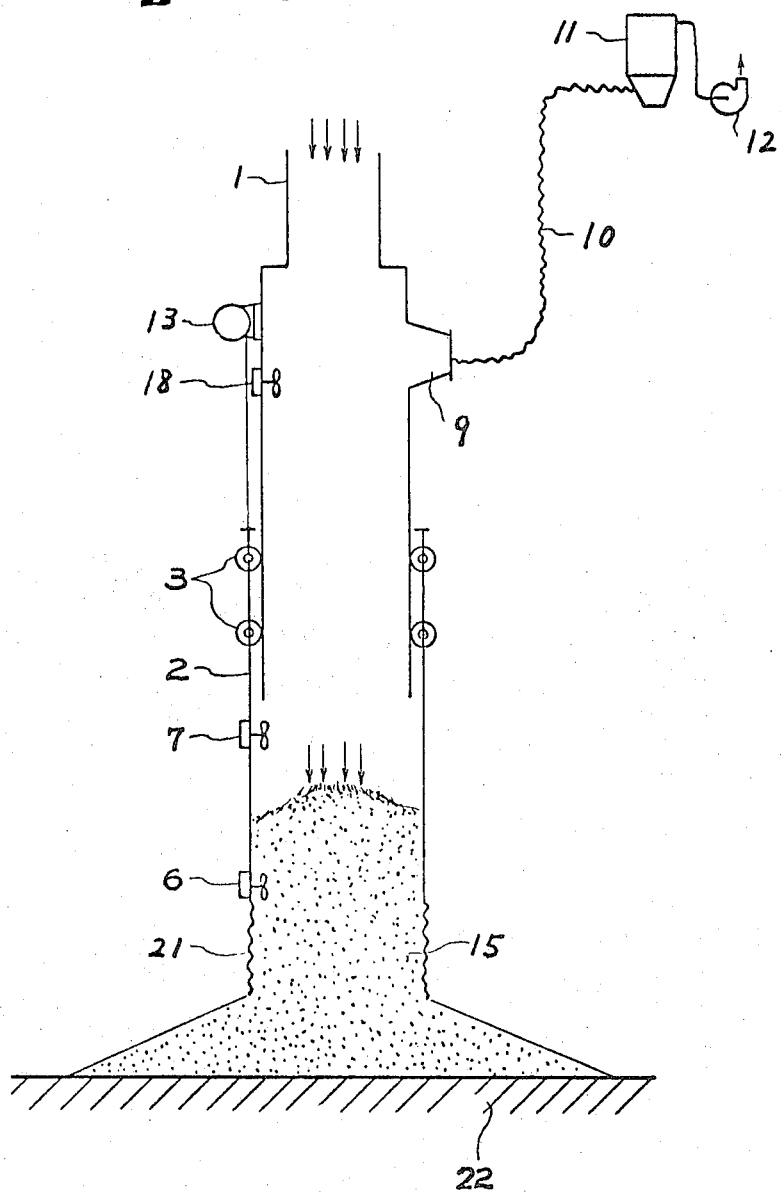
Figure 14:
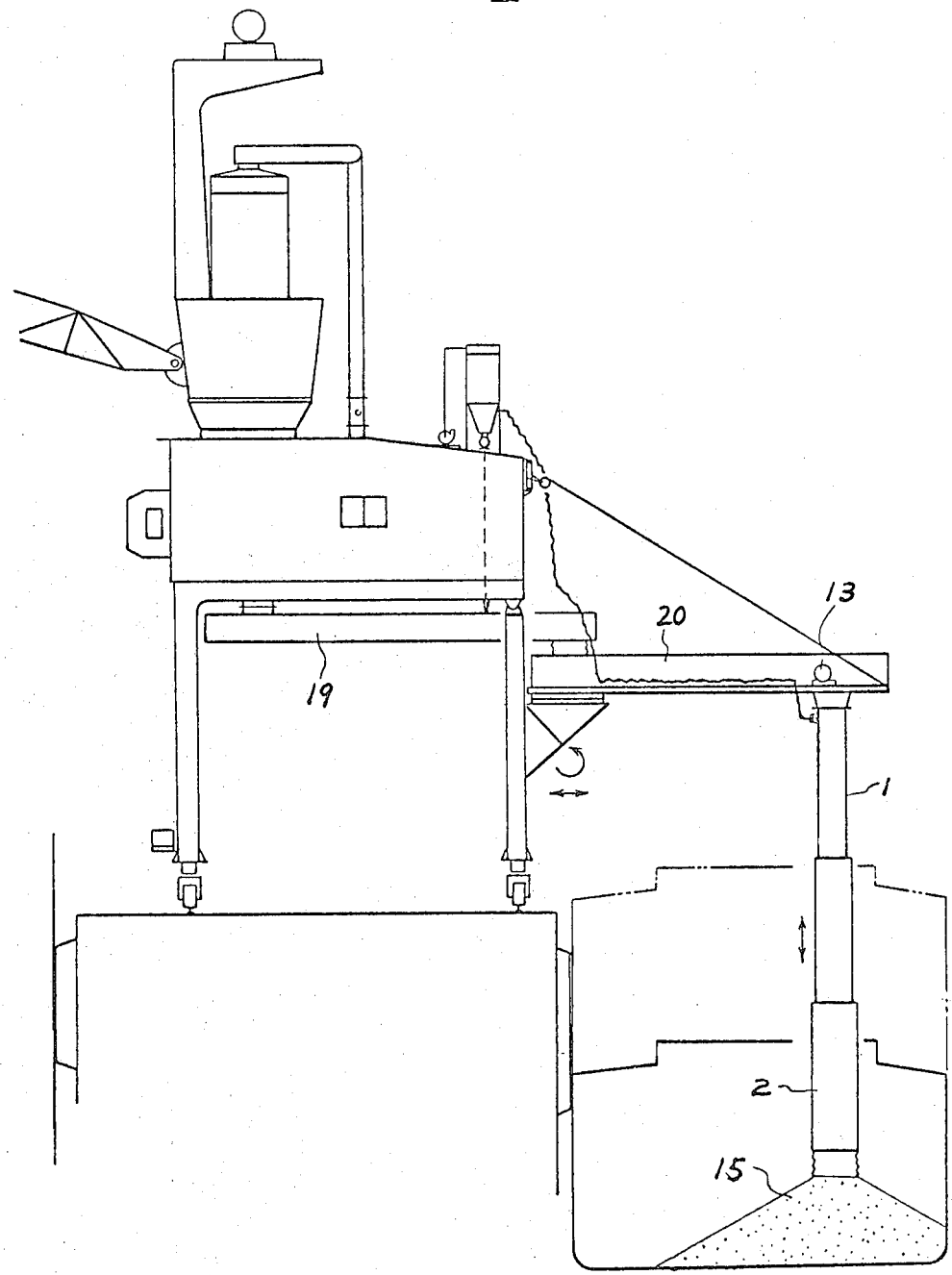
Figure 15:
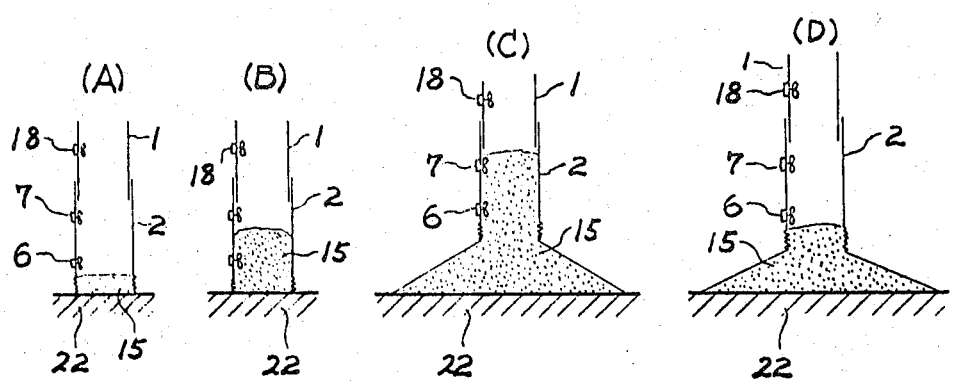
Figure 16:
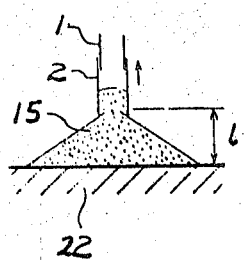
Figure 17:
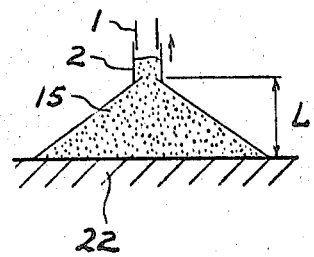
Figure 18:
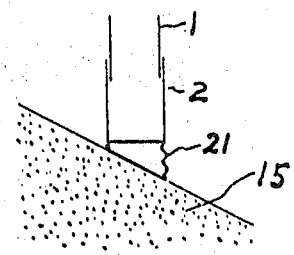

FIGS. 5(A), 5(B), 6(A), 6(B) and 6(C) are schematic views used for explanation of the principle of a first embodiment of the present invention;

FIG. 7 (A) is a schematic sectional view of a first embodiment of the present invention;

FIG. 7 (B) is a cross sectional view thereof taken along the line X—X of FIG. 7 (A);

FIG. 8 is a sectional view of a second embodiment of the present invention;

FIG. 9 is a schematic view illustrating a pneumatic ship-loading system incorporating the device of the present invention;

FIGS. 10(A) – 10(B) is a view used for explanation of the dust cloud produced when the bulk materials are discharged from a chute;

FIGS. 11, 12(A) and 12(B) are views used for explanation of the underlying principle of a third embodiment of the present invention;

FIG. 13 is a sectional view of the third embodiment of the present invention;

FIG. 14 is a schematic view illustrating pneumatic ship-loading system incorporating the third embodiment of the present invention;

FIGS. 5(A)–15D is a view used for explanation of the mode of lifting operation of the third embodiment FIGS. 16 and 17 are views used for explanation of the relationship between the chute lifting time and the height of the pile of bulk materials; and FIG. 18 is a view used for explanation of the discharge of bulk materials upon the surface of the cone of the bulk materials.

Figure 1:
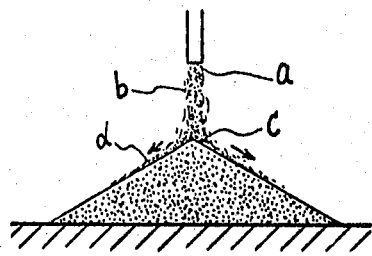
FIG. 1 is a view used for explanation of dust cloud production when the bulk materials are discharged from a chute not provided with a dust collector.

FIG. 1 illustrates the condition under which and places where the dust rises when the bulk materials are loaded through a chute when a dust collector is not installed. The dust rises from the outlet of the chute $a$, the boundary $b$ of the bulk material flow, the point $c$ at which the bulk material flow collides against the pile of the bulk materials, and the flows $d$ of the bulk materials sliding the cone surface of the pile of the bulk materials. In general, the volume of dust produced is given by $$Q = f(V, T, h)$$

where
- $Q$ = volume of dust produced,
- $V$ = speed of bulk material colliding against the pile of bulk materials,
- $T$ = volume of discharge, and
- $h$ = distance between the outlet of the chute and the top of the pile of bulk materials.

From the above relation it is seen that the collision speed must be decreased and the contact with the air of the bulk materials must be eliminated in order to reduce the volume of the dust produced. For satisfying these conditions, the following systems may be employed; (I) the system in which the bulk receiving container is covered with the hood; and (II) the system in which the dust is collected by a fan while the distance between the outlet of the chute and the top of the pile of bulk materials is maintained constant.

Figure 2:
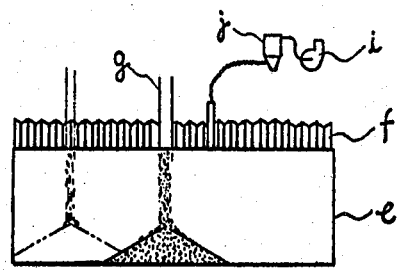
FIGS. 2–4 are views used for explanation of the dust prevention systems.

The first system (I) is illustrated in FIG. 2 in which the opening of the container $e$ is covered with a flexible hood $f$, and the dust produced from the bulk materials being loaded through a chute $g$ is sucked by a fan $i$ and collected by a bag filter $j$.

Figure 3:
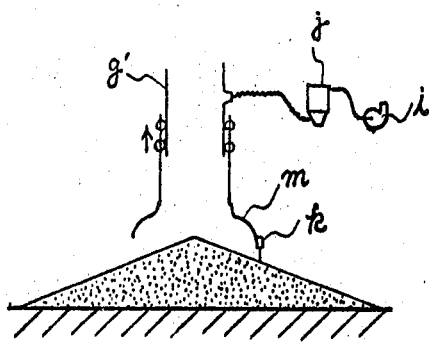
Figure 4:
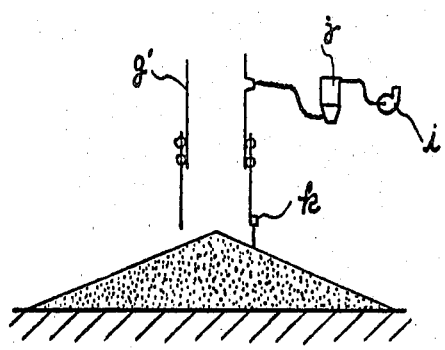

The second system (II) is illustrated in FIG. 3 in which to the lower side edge of a small hood $m$ attached to a telescopic chute $g'$ is attached a limit switch $k$ so that the distance between the discharge outlet of the hood $m$ and the upper portion of the pile of bulk materials may be maintained constant by raising the outer tube of the chute when the limit switch $k$ is actuated. The dust in the chute $g'$ is collected by a fan $i$ and collected by the bag filter $j$. Alternatively, as shown in FIG. 4, the limit switch $k$ may be directly attached to the chute $g'$ and the small hood $m$ may be eliminated.

However, the above dust collection systems (I) and (II) have the following problems:

In the system (I), (a) the dimensions of the hood must be such that it may completely cover the opening of the bulk receiving container so that a number of hoods must be ready to be fitted over the bulk receiving containers of various dimensions; (b) the dimensions and strength of the hood must be increased when the hood is used in the outdoor in order to withstand the strong wind pressure so that a large hoisting machinery will be required, thus resulting in the increase in cost; and (c) the dust naturally adheres to the hood so that the dust rises when the hood is removed from the bulk receiving container. In the system (II), (a) the air must be sucked into the small hood or chute through a narrow space between the lower side edge thereof and the surface of the pile of bulk materials at a flow rate faster than that of the dust flow so that a dust collecting fan with a considerably large capacity must be installed; and (b) the dust collecting fan and the bag filter with the greater capacity must be used so that the installation cost is inevitably increased.

Figure 10:
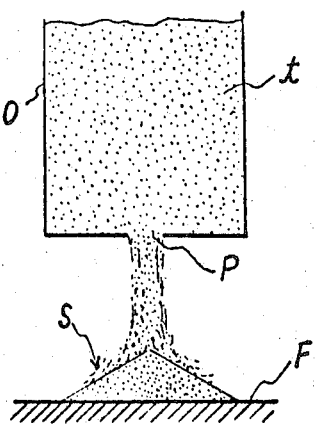

The inventors have succeeded to overcome the above problems based on the results of the extensive studies and experiments conducted by them. In the experiments, a container or chute as shown in FIG. 10 was used. The chute o was filled with grains (finely divided particles) t and discharged through a hole p formed through the bottom of the chute o. The height or distance h between the bottom of the container o and the floor F was varied, and the dust rising phenomenon or dust cloud s was observed. When the height h is less than one meter, almost no dust arises, but when the grains t is discharged as shown in FIG. 10 (B), the dust cloud starts to rise. This observed fact is based upon the above described principle given by $Q = f(V, T, h)$. Therefore, the inventors provided a discharge hole of a certain diameter which was covered with a valve and an upper and lower limits switches in the chute so that when the height or level of the grains in the chute was above the upper limit switch, the valve was opened whereas when the height of grains becomes lower than the lower limit switch as the grains had been discharged as shown in FIG. 10 (B) the valve was closed. The inventors found out that the dust can be completely prevented from rising by the above arrangement. The height or distance between the discharge outlet of the chute and the surface of the pile of bulk materials may be determined depending upon the bulk materials to be loaded, the sanitary or environmental pollution problem and so on.

The present invention therefore relates to a method and device for loading bulk materials or the like characterized in that the bulk materials are filled in a telescopic chute and thereafter the volume of the bulk materials filled in the chute is detected; the bulk materials are discharged by gravity through a discharge outlet of the chute while the bulk materials in excess of a predetermined volume may be filled in the chute; when the volume of the bulk materials in the chute becomes less than said predetermined volume, the discharge outlet is closed; and the above opening and closing of the discharge opening are repeated to discharge and load the bulk materials in such a manner that the distance between the discharge opening of the chute and the pile of the bulk materials may be maintained constant.

In order to overcome the problems of the systems (I) and (II) described above, the inventors further invented the system in which a chute is withdrawn upwardly in such a manner that the lower end of the chute may be always maintained in contact with the floor or the surface of the pile of bulk materials. Therefore the present invention provides a method and device for loading the bulk materials characterized in that the bulk materials are filled in the lower portion of a telescopic chute which may be so arranged as to extend or withdraw in stepwise; the volume of the bulk materials filled in the telescopic chute is detected by detecting means so that a predetermined volume of the bulk materials may be filled in the telescopic chute while the latter is raised and the bulk materials are discharged by gravity from the lower opening of the telescopic chute at the angle of repose; the decrease in volume of the bulk materials in the telescopic chute by said discharge is detected by detecting means so as to stop the lifting of the telescopic chute; and said filling and discharge (or lifting of the telescopic chute) of bulk materials and the stop of lifting the telescopic chute are repeated whereby the bulk materials may be loaded.

Referring to FIG. 7 illustrating an apparatus adapted for carrying out the method for loading the bulk materials in accordance with the present invention, over an inner tube 1 is slidably fitted an outer tube 2 through guide rollers 3. The outer tube 2 has an inverted frustoconical bottom and discharge opening 4 which will be referred to as "discharge portion" for brevity hereinafter, and a lower limit switch 6 and an upper limit switch 7 disposed inside the outer tube 2. The outer tube 2 may be vertically extended from and withdrawn over the inner tube 1 by a winch 13 mounted on the inner tube 1, and a discharge valve 5 which may be of a slide valve actuated by an air cylinder as shown in FIG. 7 (B) and which is fixed to the discharge opening of the discharge portion 4 is operatively coupled to the lower and upper limit switches 6 and 7. A dust collection opening 9 of the inner tube 1 is coupled through a suction duct 10 to a bag filter 11 which in turn is coupled to a fan 12 so that the dust rising in the inner and outer tubes 1 and 2 may be sucked into the duct 10 and collected by the bag filter 11. Instead of the limit switches 6 and 7, a timer may be used so that the outer tube may be lifted at a predetermined time interval.

The outer tube 2 is connected to the winch 13 with a rope 14, and the bulk materials 15 are supplied into the telescopic chute of the type described in the direction indicated by the arrows. An emergency limit switch 18 is disposed above the upper limit switch 7 so that when the supply of bulk materials into the telescopic chute is in excess of its capacity so that the level of the bulk materials in the telescopic chute is in excess of the emergency limit switch 18, the latter is actuated to stop the supply of the bulk materials into the telescopic chute and also to give the warning. This emergency limit switch 18 also may detect the zero distance between the valve 5 and the pile of the bulk materials.

Figure 5:
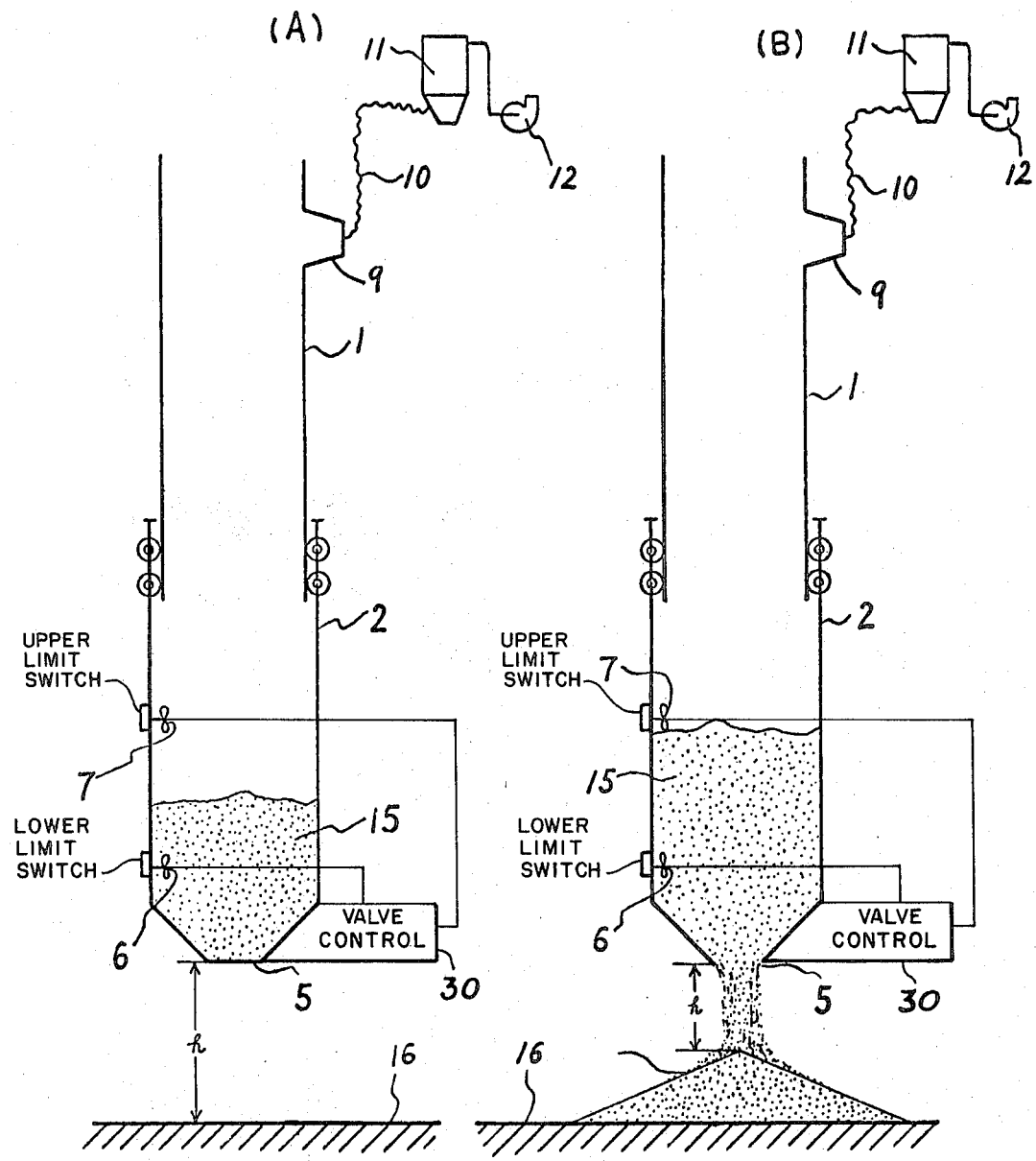

Next referring to FIG. 5, the underlying principle of the methods of the present invention shown in FIGS. 7 – 9 will be described. When the valve is closed when the bulk materials are charged into the telescopic chute comprising the inner and outer tubes 1 and 2, the dust rises only in the telescopic chute and the air displaced by the bulk materials charged into the telescopic chute scatters the dust. The valve 5 remains closed until the level of the bulk materials in the telescopic chute reaches the upper limit switch 7, and when the level is in excess of the height of the upper limit switch 7, the valve 5 is electrically or hydraulically opened by valve control 30 so that the bulk materials filled in the inner and outer tubes 1 and 2 may be discharged by gravity. When the distance h between the valve 5 and the pile of the bulk materials 17 on the floor 16 is maintained constant (for example 1,000 to 300 mm in case of grains), the discharged bulk materials may flow along the surface of the cone of the pile of bulk materials and rest on the pile at an angle of repose. In this case, the determination of the distance or height h may seem difficult, but in practice it varies over the range from 1,000 mm to 300 mm in case of grains and has a wide range of tolerance. When the distance or height is initially set to 1,000 mm, it takes a considerable time before it becomes 300 mm so that no serious problem arises in operation. When the discharge valve remains at the same level by the erroneous operation, the distance or height is gradually decreased from 300 mm to zero mm so that the discharge of the bulk materials may be automatically stopped. In this case, the emergency limit switch 18 disposed above the upper limit switch 7 is actuated so that the charge of bulk materials into the telescopic chute is stopped and the warning signal is produced. Then the operator may manually operate the winch 13 so as to lift the telescopic chute or the outer tube. Alternatively, the winch 13 may be so arranged that when the emergency limit switch 18 is actuated the winch 8 may be energized by power drive 3 for a predetermined time interval to lift the telescopic chute.

When the level of the bulk materials in the inner and outer tubes 1 and 2 of the telescopic chute reaches the lower limit switch 6 as the bulk materials are discharged, the limit switch 6 is actuated so that the discharge valve 5 is closed by valve control 30. As a result the volume of bulk materials in the telescopic chute is increased and then the bulk materials may be discharged. The loading of the bulk materials may be accomplished by cycling the above discharge and interruption of discharge. In summary, the height of the discharge valve from the floor or the pile of bulk materials may be maintained constant by the opening and closure of the discharge valve 5 which in turn is actuated by the limit switches 6 and 7 which in turn detect the lower and upper limits of the level of the bulk materials in the telescopic chute. Instead of the limit switches, the timer may be employed.

The dust in the chute is sucked through the opening 9 into the duct 10 by the fan and is collected by the bag filter 11.

The embodiments of the present invention which are shown in FIGS. 7 - 9 and whose underlying principle has been described with reference to FIG. 5, will be further described in more detail with reference to FIG. 6 hereinafter. When the bulk materials 15 are initially charged into the telescopic chute, the outer tube 2 is lowered and the discharge valve 5 is closed and maintained at a predetermined height (the maximum distance) above the floor 16 as shown in FIG. 6 (A).

Figure 6:
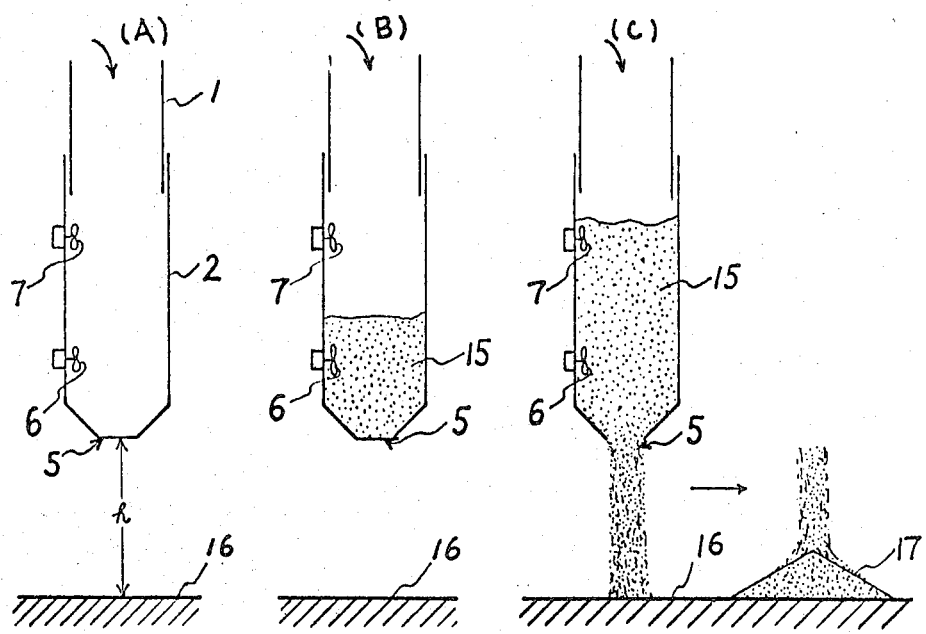

The bulk materials charged into the telescopic chute is gradually increased as shown in FIG. 6 (B), and when the level of the bulk materials reaches the upper limit switch 7, the latter is actuated so that the valve 5 is opened as shown in FIG. 6 (C). The bulk materials discharged from the telescopic chute are now piled upon the floor 16 in the form of a cone with an angle of repose of the bulk materials. The bulk materials discharged flow along the surface of the cone, and the cone of the pile of the bulk materials is gradually increased in volume. Before the distance between the top of the cone and the discharge valve 5 reaches the minimum distance $h$, the operator manually operates the winch 13 so that the distance h may be reset to the maximum distance.

Since the volume of the pile of bulk materials is given by $$V = H \times \pi r^2 /3$$

where

H: height of pile; and
r: radius of pile, the adjustment of the height of the discharge valve must be made very frequently in the initial stage, but when the height of the pile reaches a certain level, the frequency of the height adjustments becomes of course less.

When the volume of the bulk materials in the telescopic chute is decreased so that the lower limit switch 6 is actuated, the discharge valve 5 is closed. Instead of the lower limit switch 6, the timer may be employed and set to a predetermined time depending upon the discharge rate. The bulk materials may be loaded by cycling the above operations without producing the dust clouds.

The dust rising in the telescopic chute is sucked through the dust collection opening 9 into the duct 10 by the fan 12 and collected by the bag filter 11. The volume of the air required for collecting the dust in the telescopic chute may be sufficiently obtained from the volume of the air displaced in the telescopic chute and the air flowing therein through the space between the inner and outer tubes 1 and 2, and the fan 12 with a small capacity may be employed.

In the embodiment shown in FIG. 7 (A), an appropriate sealing member may be interposed between the inner and outer tubes 1 and 2 at the position indicated by $w$ so that the volume of the air flowing through the space between the inner and outer tubes 1 and 2 into the telescopic chute.

The dust collected by the bag filter 11 may be returned to the conveyor or the like in the upstream of the telescopic chute.

FIG. 9 shows one example of the pneumatic shiploading system incorporating the telescopic chute shown in FIG. 7. A swivel or shuttle conveyor 20 is operatively coupled to the discharge end of a stationary conveyor 19 below a portal frame, and the telescopic chute in accordance with the present invention is arranged at the discharge end of the conveyor 20. The telescopic chute must have a sufficient stroke to follow the vertical movement of the ship due to the turn of the tide and the weight of the bulk materials loaded into the hold of a ship or berge. More particularly, the outer tube 2 of the telescopic chute may be extended or withdrawn to follow the vertical motion of the ship whereas the swivel or shuttle conveyor 20 follows the horizontal motion of the ship so that the bulk materials may be loaded into the hold of the ship.

The telescopic chute in accordance with the present invention shown in FIG. 7 is not only used for loading the bulk materials into the hold of the ship as shown in FIG. 9 but also for loading the bulk materials such as finely divided particles into the freight cars, bulk trucks or the like. In the embodiment shown in FIG. 7, the telescopic chute has been shown as comprising the two tubes 1 and 2, but the telescopic chute may comprise any number of tubes as for example three tubes as shown in FIG. 9. Alternatively, as shown in FIG. 8, a bellows 1' may be interposed between the tube 1 and the lower tube 2 in such a manner that the latter may be lifted by a lifting device comprising a frame 13-1, a rope 13-2, rope sheaves 13-3, a rope tube 13-4 and a winch 13-5.

In the embodiment shown in FIG. 7, the discharge valve 5 of the type shown in FIG. 7 (B) is used which is actuated by an air cylinder, but the present invention is not limited thereto. Any valve which may be opened and closed may be used as the discharge valve of the telescopic chute of the present invention. As to the system for actuating the discharge valve, any appropriate system such as electric, hydraulic or pneumatic system may be used.

In the embodiments shown in FIGS. 7 and 8, the telescopic chutes have been shown as being installed vertically, but it may be understood that they may be installed at an angle relative to the vertical line if required. An automatic system may be used in which the discharge valve may be opened or closed or its degree of opening may be controlled in response to the variation in charge of the bulk materials into the telescopic shute by a loading system in the upstream of the telescopic chute or in response to the weight of the telescopic chute including the bulk materials therein.

As described above with reference to FIGS. 7 – 9, when the level of the bulk materials is in excess of a predetermined level in the telscopic chute, the upper limit switch is actuated to open the discharge valve, but when the level of the bulk materials becomes less than a predetermined lower level, this is detected directly or indirectly so that the discharge valve is closed. Since the above operations are cycled when the bulk materials are loaded, the present invention have the following advantages:

I When the bulk materials are discharged, the level of the bulk materials in the telescopic chute is maintained above a predetermined upper limit so that no dust rises when the bulk materials are discharged.

II Since the bulk materials are discharged from the telescopic chute at a predetermined height, the bulk material handling becomes simple and highly efficient in operation. That is, when the height of the discharge valve of the telescopic chute is maintained in the range from $h_1$ to $h_2$ (where $h_1$ is the height from the floor to the discharge valve; and $h_2$, from the top of the pile of bulk materials to the discharge valve), the adjustment of the height of the discharge valve is not required, and the operation may be safeguarded even when $h_2$ becomes zero.

III The dust rising in the telescopic chute may be sucked through the dust collection opening provided at the upper portion of the telescopic chute into the dust suction duct by the fan. Furthermore since the dust rises in the sealed container, the air required for collecting the dust may be sufficiently supplied from the air displaced by the bulk materials in the telescopic chute and the air flowing therein through the space or spaces between the tubes so that the fan and bag filter with a small capacity may be used.

IV The installation cost is low because the dust collection fan as well as the bag filter may be small in capacity and compact in size.

V The telescopic chute in accordance with the present invention finds a wide use for loading the bulk materials into ships, trucks, freight cars and the like.

Next referring to FIGS. 11–18, the further embodiment of the telescopic chute in accordance with the present invention will be described. First referring to FIG. 13, the telescopic chute shown is similar in construction to that shown in FIG. 7 except that a bellows 21 is fixed to the lower end of the slidable outer tube 2. That is, over the inner tube 1 is slidably fitted the outer tube 2 through the guide rollers 3. The outer tube 2 has the bellows 21 fixed to the lower end thereof and the lower and upper limit switches 6 and 7. The dust collection opening 9 is communicated through the flexible suction duct 10 with the bag filter 11 which in turn is coupled to the dust collection fan 12. The bulk materials 15 are discharged onto the floor 22.

Figure 12:
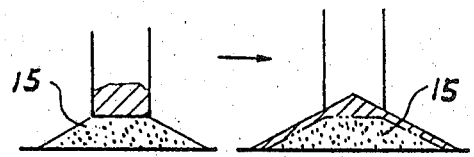

Next referring to FIGS. 13 – 16, the underlying principle of the embodiment shown in FIG. 14 will be described. When the bulk materials supplied are stored in the telescopic chute, the dust rises in the chute and is agitated by and scattered into the air displaced by the bulk materials charged into the telescopic chute. When the telescopic chute is raised, the bulk materials stored in the chute (See FIG. 12 (A)) is discharged as shown in FIG. 12 (B) by gravity along the surface of the cone inclined generally at an angle equal to an angle of repose of the bulk materials. Thus, the bulk materials stored in the lower portion of the telescopic chute may be discharged when the latter is lifted, and since the bulk materials discharged from the chute flow under gravity downwardly, no dust rises. The dust which rises in the telescopic chute is sucked through the dust collection opening 9 into the suction duct by the fan 12 and collected by the bag filter 11.

The embodiment shown in FIGS. 13 – 15 is based upon the above described principle. Next the mode of operation will be described. When the bulk materials 15 are initially supplied into the telescopic chute, the sliding outer tube 2 is lowered so that the lower ends of the bellows 21 is made into contact with the floor 22. (See FIG. 15 (A)). The level of the bulk materials in the telescopic chute rises as shown in FIG. 15 reaches the upper limit switch 7 (See FIG. 15 (C)) so that the latter is actuated so as to lift the outer sliding tube 2. As a result, the bulk materials 15 stored in the chute are discharged through the lower opening of the bellow 21 onto the floor 22. Since the discharged bulk materials flow by gravity at an angle substantially equal to an angle of reposes, no dust rises. (See FIG. 15 (D)). When the level of the bulk materials in the telescopic chute is below the lower limit switch 6 as the bulk materials are discharged, the limit switch 6 is actuated so that the lifting of the outer sliding tube 2 may be stopped as shown in FIG. 15 (D). Hence the bulk materials may be continuously loaded by the cyclic repetition of the above operations.

The speed with which the outer sliding tube 2 is lifted is determined depending upon the rate at which the bulk materials are charged into the telescopic chute. When the rate at which the bulk materials are charged into the telescopic speed is faster than the outer sliding tube lifting rate, the bulk materials in the telescopic chute is increased so that the level of the bulk materials in the chute rises above the upper limit switch. Hence, the outer tube lifting speed must be faster than the rate at which the bulk materials are stored in the chute. The time interval when the outer sliding tube 2 is lifted is depending upon the height of the pile of the bulk materials when the outer tube lifting speed is constant. When the height $l$ of the pile of the bulk materials is low, the outer tube lifting time becomes longer (See FIG. 16), whereas the height H is higher than $l$, the outer tube lifting time becomes shorter (See FIG. 17). The time interval from the time when the level of the bulk materials is same with that of the lower limit switch 6 to the time when the level of the bulk materials reaches the upper limit switch 7 is dependent upon the capacity of the loading machine. In order to safeguard the loading operation, an emergency limit switch much be provided above the upper limit switch 7 as in the case of the embodiments described with reference FIGS. 7, 8 and 9.

When the outer sliding tube 2 is being lifted, the dust in the inner and outer tubes 1 and 2 is suctioned into the flexible duct 10 through the dust collection opening 9 by the fan 12 and is collected by the bag filter 11. Since the dust rises in the sealed container, the air required for collecting the dust may be sufficiently supplied by the air displaced in the chute by the bulk materials and the air flowing through the space between the inner and outer tubes 1 and 2 into the chute so that the fan 9 may be of a small capacity. The dust collected by the bag filter 11 is returned to the loading system in the upper stream of the telescopic chute.

In the embodiment described so far with reference to FIGS. 13 – 15, the bulk materials charged into the telescopic chute is accumulated in the lower portion thereof and the dust which rises only within the chute is sucked into the bag filter 11 by the fan 12. The bulk materials are discharged when the outer sliding tube 2 is lifted so that the discharged bulk materials can flow by gravity along the cone surface at an angle of repose of the bulk materials. Thus, the problem of dust can be overcome.

The power required for lifting the outer tube 2 in which are stored the bulk materials is the product of the horizontal pressure of the bulk materials in the chute multiplied by the coefficient of friction between the inner and outer tubes 1 and 2. As is clear from Janssen's equation, the power is small.

When it is desired to discharge the bulk materials upon the surface of the pile of bulk materials by the telescopic chute shown in FIGS. 13 – 15, the bellows 21 are made into contact with the bulk materials as shown in FIG. 18 so that there is no space between the lower opening of the outer tube and the bulk materials. Therefore, no dust will rise. Instead of the bellows 21, a flexible skirt may be attached to the lower end of the outer tube 2 in order to eliminate the space between the lower end of the outer tube 2 and the bulk materials. This arrangement also serves to prevent the dust from rising when the bulk materials are discharged.

FIG. 14 illustrates a pneumatic ship-loading system incorporating the telescopic chute in accordance with the present invention. The discharge end of the stationary conveyor 19 under the portal frame is operatively coupled to the swivel or shuttle conveyor 20 at the discharge end of which is disposed the telescopic chute of the present invention. As in the case of the pneumatic ship-loading system shown in FIG. 9, the telescopic shute has a stroke sufficiently to follow the vertical motion of the barge due to the turn of the tide and due to the weight of the bulk materials loaded into the barge. That is, the telscopic chute is extended or withdrawn to follow the vertical motion of the barge whereas the swivel or shuttle conveyor 20 follows the horizontal motion of the barge.

The telescopic chute in accordance with the present invention described with reference to FIGS. 13 – 15 is used for loading the bulk materials into not only the barge but also the freight cars, bulk trucks and the like. In the embodiment shown in FIG. 13, the telescopic chute is shown as comprising the two tubes, but it may comprise any number of tubes as shown in FIG. 14 where the telescopic chute is shown as comprising three tubes.

The telescopic chute described so far with reference to FIGS. 11 – 18 has the following advantages.

I Since the bulk materials are discharged by lifting the telescopic chute in which a predetermined volume of bulk materials is always stored, the discharged bulk materials flow by gravity along the cone surface inclined at an angle substantially equal to the angle of repose of the bulk materials so that no dust rises.

II The dust rises only within the telescopic chute and is easily collected by the dust collection fan. The air required for collecting the dust may be sufficiently supplied by the air displaced in the telescopic chute by the bulk materials and the air flowing into the chute through the space or spaces between the tubes of the telescopic chute so that the fan with a small capacity may be advantageously used.

III The installation cost is low because the dust collection fan as well as the bag filter are small in capacity and compact in size.

IV The telescopic chute in accordance with the present invention finds a wide application for loading the bulk materials into the ships, barges, freight cars, bulk trucks, and the like.

What is claimed is:

1. A device for loading bulk materials comprising a flexible telescopic chute defined by inner and outer tubes relatively telescopically fitted one over the other,, means disposed in the lower portion of said telescopic chute in vertically spaced apart relation for detecting the upper and lower limit positions of the bulk materials in said telescopic chute and a driving device for pulling up said chute, said driving device being controlled by said detecting means whereby the bulk in said chute is maintained between the upper and lower limit positions while the bulk is being loaded.

2. The device as claimed in claim 1 wherein there is further included a discharge valve fixed to the lower end of said telescopic chute and operatively coupled to said detecting means in such a manner that said discharge valve may be opened or closed in response to the signals from said detecting means.

3. The device as claimed in claim 2 wherein there is further included a dust collector disposed outside of and coupled to said telescopic chute through a flexible pipe for collecting the dust which rises in said telescopic chute.

4. The device as claimed in claim 2 wherein there is further included a discharge opening, said valve and said discharge opening being closed when the bulk remaining in the chute is lowered to the position of said detecting means for detecting the lower limit position, said valve and said discharge opening being opened when the remaining bulk rises to the position of said detecting means for detecting the upper limit position during the bulk loading operation.

5. The device as claimed in claim 1 wherein there is further included a pipe in communication with the interior of said chute proximate the upper end thereof and vacuum suction means for sucking the dust floating in said chute into said pipe.

6. The device in accordance with claim 1 wherein there is further included a flexible bellows interconnected between said telescoped tubes and capable of extending and contracting.

7. The device in accordance with claim 1 wherein there is further included a bellows fixed to the lower end of said telescopic chute so that the lower edge of said bellows is adapted to contact the pile of the bulk material.

8. The device in accordance with claim 1 wherein there is further included an emergency limit switch located in said chute in vertically spaced apart relation above said detecting means for detecting the upper limit portion, said switch being adapted to stop the supply of the bulk material when the material in said chute is above the upper limit position.

* * * * *